(12) United States Patent
Chu (10) Patent No.: US 7,787,337 B2
(45) Date of Patent: Aug. 31, 2010

(54) METHOD FOR DETECTING DATA DEFECT IN OPTICAL RECORDING MEDIUM

(76) Inventor: Sherlock Chu, 8Fl., No. 535, Jungjeng Rd., Shindian City, Taipei (TW) 231

( * ) Notice: Subject to any disclaimer, the term of this patent is extended or adjusted under 35 U.S.C. 154(b) by 1212 days.

(21) Appl. No.: 11/205,260

(22) Filed: Aug. 16, 2005

(65) Prior Publication Data

US 2006/0039252 A1   Feb. 23, 2006

(30) Foreign Application Priority Data

Aug. 17, 2004  (TW) .............................. 93124729 A (51) Int. Cl.
G11B 7/00    (2006.01)
(52) U.S. Cl. ................. 369/53.15; 369/44.33
(58) Field of Classification Search .................. None
See application file for complete search history.

(56) References Cited

U.S. PATENT DOCUMENTS

| | | |
|---|---|---|
| 4,390,781 A | 6/1983 | Musha |
| 4,512,004 A | 4/1985 | Nonaka et al. |
| 4,707,648 A | 11/1987 | Minami |
| 4,707,816 A | 11/1987 | Yonezawa et al. |
| 4,730,290 A * | 3/1988 | Takasago et al. ......... 369/30.21 |
| 4,878,211 A | 10/1989 | Suzuki et al. |
| 5,029,155 A | 7/1991 | Kenjo et al. |
| 5,146,443 A | 9/1992 | Iwase et al. |
| 5,199,015 A | 3/1993 | Edahiro et al. |
| 5,216,659 A | 6/1993 | Call et al. |
| 5,245,598 A | 9/1993 | Burroughs |
| 5,297,114 A | 3/1994 | Itoh et al. |
| 5,367,513 A | 11/1994 | Bates et al. |
| 5,475,664 A | 12/1995 | Shimizume et al. |
| 5,504,726 A | 4/1996 | Semba |
| 5,563,920 A | 10/1996 | Fimoff et al. |
| 5,568,464 A | 10/1996 | Horie |
| 5,587,985 A | 12/1996 | Sano et al. |
| 5,602,814 A | 2/1997 | Jaquette et al. |

(Continued)

FOREIGN PATENT DOCUMENTS

CN    1407552    4/2003

(Continued)

OTHER PUBLICATIONS

U.S. Appl. No. 12/604,307, filed Oct. 22, 2009, Tsai et al.

(Continued)

*Primary Examiner*—Peter Vincent Agustin
(74) *Attorney, Agent, or Firm*—Perkins Coie LLP (57) ABSTRACT

A data signal includes a master signal generated by a master part of an optical pickup head in response to a light beam reflected from the optical recording medium and a side signal generated by a side part of the optical pickup head in response to the light beam reflected from the optical recording medium. A discriminating signal is obtained by subtracting the master signal from the side signal. Then, whether a data defect is existent in a data storage region of the optical recording medium can be determined according to the discriminating signal and optionally the side signal. When the data defect is determined existent, a servo tracking operation in the reading procedure is suspended.

18 Claims, 8 Drawing Sheets

| Data Defect Type \ SBAD \ RFRP1 | Down & lower than L1 | Down & higher than L1 | Little variation & higher than L1 |
|---|---|---|---|
| Down & lower than L3 | Serious scratch | Small scratch | Data interruption |
| | ↓ | ↓ | ↓ |
| | Tracking suspended | Tracking continued | Tracking supended |

U.S. PATENT DOCUMENTS

| | | | |
|---|---|---|---|
| 5,623,465 | A | 4/1997 | Sasaki et al. |
| 5,642,340 | A | 6/1997 | Nomura |
| 5,677,935 | A | 10/1997 | Karino |
| 5,703,848 | A | 12/1997 | Hofer |
| 5,710,748 | A | 1/1998 | Hofer |
| 5,732,052 | A | 3/1998 | Ando et al. |
| 5,748,584 | A | 5/1998 | Maezawa |
| 5,844,920 | A | 12/1998 | Zook et al. |
| 6,069,667 | A | 5/2000 | Ueda et al. |
| 6,069,855 | A | 5/2000 | Fuma et al. |
| 6,157,601 | A | 12/2000 | Kao et al. |
| 6,269,058 | B1 | 7/2001 | Yamanoi et al. |
| 6,404,713 | B1 | 6/2002 | Ueki |
| 6,560,173 | B2 | 5/2003 | Shimamura et al. |
| 6,611,123 | B2 | 8/2003 | Ono |
| 6,628,594 | B1 | 9/2003 | Park |
| 6,633,523 | B1 | 10/2003 | Masaki et al. |
| 6,691,203 | B1 | 2/2004 | Chen et al. |
| 6,731,624 | B1 | 5/2004 | Maekawa et al. |
| 6,745,167 | B2 | 6/2004 | Sun |
| 6,757,239 | B2 | 6/2004 | Minamino et al. |
| 6,882,611 | B2 | 4/2005 | Chen |
| 6,906,986 | B2 | 6/2005 | Lee et al. |
| 6,934,227 | B2 | 8/2005 | Nakata et al. |
| 6,970,522 | B1 | 11/2005 | Morling et al. |
| 7,035,176 | B2 | 4/2006 | Tsai |
| 7,092,324 | B2 | 8/2006 | Koh |
| 7,095,693 | B2 * | 8/2006 | Sasaki et al. ............ 369/53.15 |
| 7,120,100 | B2 | 10/2006 | Hung et al. |
| 7,149,169 | B2 | 12/2006 | Juan et al. |
| 7,242,650 | B2 | 7/2007 | Tsai et al. |
| 7,245,573 | B2 | 7/2007 | Eom |
| 7,286,462 | B2 | 10/2007 | Tsai et al. |
| 7,298,674 | B2 | 11/2007 | Lai et al. |
| 7,349,310 | B2 | 3/2008 | Chen et al. |
| 7,385,896 | B2 | 6/2008 | Lai et al. |
| 7,542,390 | B2 | 6/2009 | Ouyang et al. |
| 7,619,956 | B2 | 11/2009 | Tsai |
| 7,646,682 | B2 | 1/2010 | Lei et al. |
| 2001/0019603 | A1 | 9/2001 | McMahon |
| 2002/0009026 | A1 | 1/2002 | Shimamura et al. |
| 2002/0131350 | A1 | 9/2002 | Kurobe et al. |
| 2003/0048707 | A1 * | 3/2003 | Ono ....................... 369/44.29 |
| 2003/0053387 | A1 | 3/2003 | Lee et al. |
| 2003/0147315 | A1 | 8/2003 | Iwazawa et al. |
| 2003/0169649 | A1 | 9/2003 | Takaoka et al. |
| 2004/0037177 | A1 * | 2/2004 | Buchler ................... 369/44.28 |
| 2004/0052183 | A1 | 3/2004 | Yu et al. |
| 2004/0130993 | A1 | 7/2004 | Nadershahi |
| 2004/0179451 | A1 | 9/2004 | Morishima et al. |
| 2005/0157606 | A1 | 7/2005 | Hu et al. |
| 2005/0195717 | A1 * | 9/2005 | Lai et al. ................. 369/53.16 |
| 2005/0251671 | A1 | 11/2005 | Ouyang et al. |
| 2006/0013083 | A1 * | 1/2006 | Koh ........................ 369/44.27 |
| 2006/0056555 | A1 | 3/2006 | Oono et al. |
| 2007/0237044 | A1 * | 10/2007 | Jin et al. ................. 369/47.14 |
| 2008/0205240 | A1 | 8/2008 | Lai et al. |
| 2009/0003163 | A1 | 1/2009 | Chen et al. |

FOREIGN PATENT DOCUMENTS

| | | |
|---|---|---|
| CN | 1481553 | 3/2004 |
| CN | 1519667 | 5/2005 |
| CN | 1619660 | 5/2005 |
| CN | 1619661 | 5/2005 |
| CN | 1619662 | 5/2005 |
| CN | 1619668 | 5/2005 |
| CN | 1629947 | 6/2005 |
| JP | 10040546 | 2/1998 |
| JP | 10083540 | 3/1998 |
| JP | 63117336 | 5/1998 |
| JP | 2001067682 | 3/2001 |
| TW | 200518049 | 6/2005 |
| TW | 200518073 | 6/2005 |
| TW | 200518078 | 6/2005 |
| TW | 200518081 | 6/2005 |
| TW | 200522040 | 7/2005 |
| TW | 200518048 | 12/2006 |
| WO | 0249023 | 6/2002 |

OTHER PUBLICATIONS

Machine Translation of Okamatsu, JP-10-083540, published Mar. 31, 1998.
First Office Action; Application No. TW 93135312 Filed Nov. 17, 2004; Date of Mailing: Feb. 18, 2009, 3 pages [translation attached].
Notice of Allowance; U.S. Appl. No. 10/990,665; Mailed Jan. 29, 2008; 6 pages.
Non-Final Office Action; U.S. Appl. No. 10/990,665; Mailed Jul. 17, 2007; 21 pages.
Final Office Action; U.S. Appl. No. 10/990,665; Mailed Oct. 2, 2007; 10 pages.
Non-Final Office Action; U.S. Appl. No. 10/990,860; Mailed Jul. 30, 2007; 9 pages.
Final Office Action; U.S. Appl. No. 10/990,860; Mailed Oct. 17, 2007; 8 pages.
Non-Final Office Action; U.S. Appl. No. 10/990,860; Mailed Feb. 11, 2008; 11 pages.
Final Office Action; U.S. Appl. No. 10/990,860; Mailed Jul. 16, 2008; 7 pages.
Non-Final Office Action; U.S. Appl. No. 10/990,860; Mailed Dec. 9, 2008 9 pages.
Non-Final Office Action; U.S. Appl. No. 10/990,860; Mailed Apr. 17, 2009; 10 pages.
Notice of Allowance for U.S. Appl. No. 10/990,860; Mailed Sep. 10, 2009; 5 pages.
Final Rejection; CN Application No. 2004100683527 filed Aug. 31, 2004; Applicant: Via Technologies, inc.; Date of Issue Sep. 4, 2009; 13 pages.
Notice of Allowance; U.S. Appl. No. 10/990,655; Mailed Apr. 2, 2008; 10 pages.
Notice of Allowance; U.S. Appl. No. 10/990,655; Mailed Jul. 24, 2008; 7 pages.
Notice of Allowance; U.S. Appl. No. 10/990,655; Mailed Dec. 23, 2008; 8 pages.
Notice of Allowance; U.S. Appl. No. 10/990,655; Mailed Jun. 11, 2009; 9 pages.
Notice of Allowance; U.S. Appl. No. 10/990,669; Mailed Sep. 20, 2007; 4 pages.
Ex Parte Quayle Office Action; U.S. Appl. No. 10/990,669; Mailed Jul. 13, 2007; 6 pages.
Notice of Allowance; U.S. Appl. No. 10/990,805; Mailed Oct. 26, 2007; 4 pages.
Ex Parte Quayle Office Action; U.S. Appl. No. 10/990,805; Mailed Jul. 24, 2007; 7 pages.
Notice of Allowance; U.S. Appl. No. 10/990,909; Mailed Aug. 15, 2007 (9 pgs.).
Notice of Allowance; U.S. Appl. No. 12/021,239; Mailed Dec. 16, 2009; 7 pages.
Non-Final Office Action; U.S. Appl. No. 11/021,679; Mailed Nov. 14, 2007; 12 pages.
Final Office Action; U.S. Appl. No. 11/021,679; Mailed Aug. 18, 2008; 13 pages.
Non-Final Office Action; U.S. Appl. No. 11/021,679; Mailed Mar. 3, 2009; 14 pages.
Non-Final Office Action; U.S. Appl. No. 11/021,679; Mailed Nov. 12, 2009; 18 pages.
Notice of Allowance; U.S. Appl. No. 10/907,859; Mailed Jan. 27, 2009; 6 pages.
Notice of Allowance; U.S. Appl. No. 10/907,859; Mailed Sep. 9, 2008, 2009; 7 pages.

* cited by examiner

METHOD FOR DETECTING DATA DEFECT IN OPTICAL RECORDING MEDIUM

FIELD OF THE INVENTION

The present invention relates to a method for detecting a data defect, and more particularly to a method for detecting a data defect existing in an optical recording medium.

BACKGROUND OF THE INVENTION

Data defects may exist in optical recording medium such as compact discs, video compact discs or digital video discs due to imperfect recording quality, inadequate preserving condition or incorrectly operating the discs. The poor conditions of discs themselves, for example suffering from scratches or contaminants, are also likely to result in undesired data defects. The data defects could be rendered in various aspects. For example, a slicer in an optical reading system is used for converting the read analog signals into digital signals according to a default central level signal. The default central level signal is a predetermined voltage value stored in the optical reading system. When the read analog signal is higher than the default central level signal, the sliced digital signal will be a high level signal. When the read analog signal is lower than the default central level signal, the sliced digital signal will be a low level signal. If there is any data defect existing in the optical disc, the read analog signal will be affected by the data defect, so that the sliced digital signal will be obtained with errors. If the error-sliced digital signal is operated by the following data processing circuit and then is processed by the continuing servo tracking operation, it causes errors of the data processing or a crash of the optical reading system. For preventing the data-reading procedure from being affected by data defects, it is preferred to detect these data defects existing in the discs and take adequate measures in advance.

Figure 1:
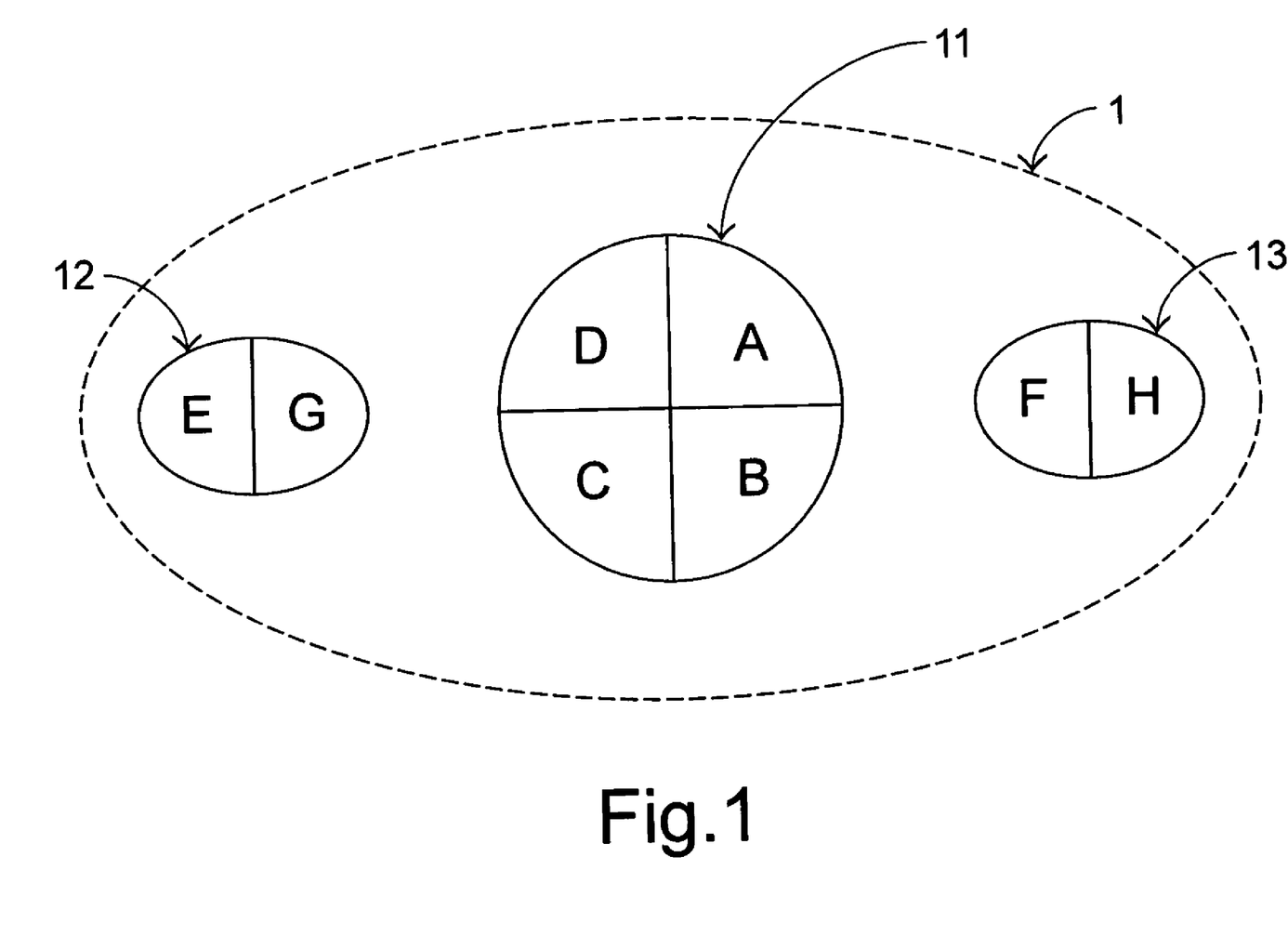
FIG. 1 is a schematic diagram showing the light-receiving portions of an optical pickup head.

Please refer to FIG. 1 which is a schematic diagram showing the light-receiving portions of an optical pickup head. The optical pickup head 1 includes a master part 11 having four receiving portions A~D, a first side part 12 having two receiving portions E and G, and a second side part 13 having two receiving portions F and H. The laser light emitted from the optical pickup head 1 is reflected by the optical disc. The reflected laser signal carries certain data stored in the focused spot of the optical disc. Then, the reflected laser signal is received by the eight receiving portions A~H to be processed into useful signals. One of the useful signals is a sub-beam addition signal (SBAD) signal. The SBAD signal is substantially the summation of the sub-beam signals generated by the light-receiving portions E, F, G and H in response to the received light intensities. Conventionally, the optical reading system monitors the SBAD signal to realize the data-storage quality of an optical disc. If the level of the SBAD signal is lower than a predetermined level, it is determined that data defects occur. In the meantime, the subsequent servo tracking operation of the optical reading system is suspended to prevent from incorrect data processing of the data stored in the optical disc.

Figure 2A:
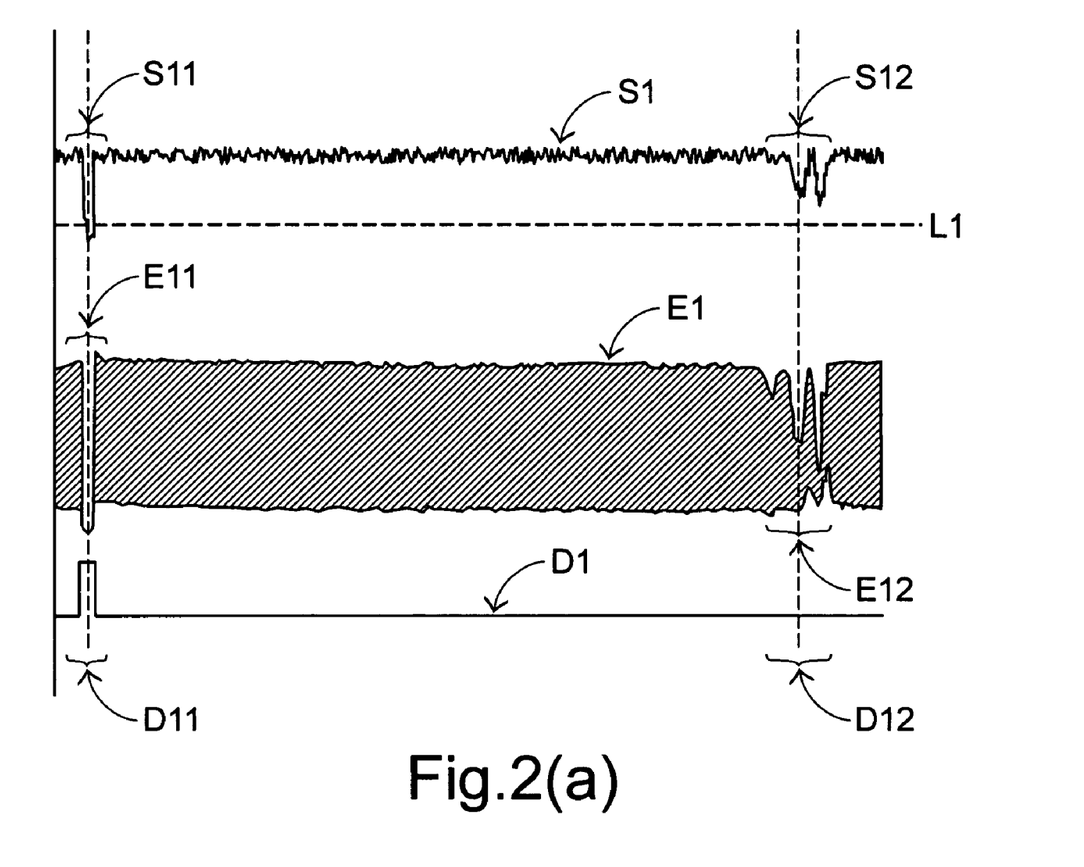
FIG. 2(a) is a schematic diagram showing the relationship among SBAD, data and defect-indicating signals when there are scratches existing in the read optical disc.

An example that there are serious and small scratches existing in the data storage region of a disc is given with reference to FIG. 2(a) in which the relationships among SBAD, data and defect-indicating signals are shown. Due to a serious scratch in the data storage region of the disc, a data signal drop E11 of the data signal E1 is rendered, and a signal drop S11 occurs in the SBAD signal S1 correspondingly. Since the signal drop S11 has been down lower than a preset threshold level L1, the defect-indicating signal D1 is switched to a high level D11 to suspend the servo tracking operation of the optical reading system, thereby protecting the optical reading system from errors or hanging. After the scratch has been passed and the defect-indicating signal D1 is switched back to a low level, the servo tracking operation of the optical reading system is restored. The preset threshold level L1 can be a voltage value stored in the optical reading system.

Afterwards, another scratch that is less serious in the data storage region of the disc is encountered, so a less data signal drop E12 of the data signal E1 is rendered. Correspondingly, a less signal drop S12 occurs in the SBAD signal S1. Since the signal drop S12 has not been down to the preset threshold level L1, the defect-indicating signal D1 will not be switched to a high level D11 to suspend the servo tracking operation of the optical reading system. Instead, the defect-indicating signal D1 stays low as indicated by the reference D12.

Figure 2B:
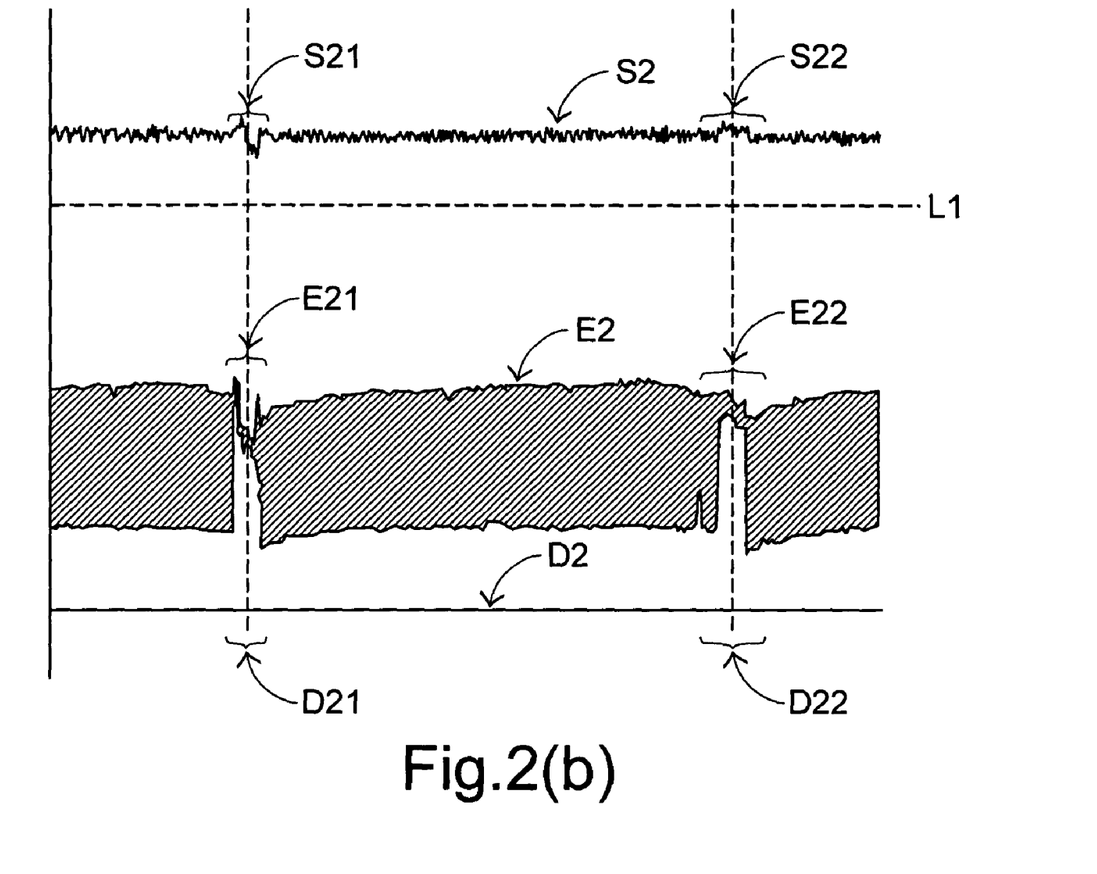
FIG. 2(b) is a schematic diagram showing the relationship among SBAD, data and defect-indicating signals when there are data interruptions occurring in the read optical disc.

Unfortunately, in a case that the SBAD signal S1 cannot reflect the real defect situation, e.g. data interruption E21 and E22 occurring in the data signal E2 as exemplified in FIG. 2(b), errors may happen. Since the signal drops S21 and S22 of the SBAD signal S2 corresponding to the data interruption E21 and E22 are insignificant, i.e. not lower than the preset threshold level L1, there will be no high-level peaks occurring in the defect-indicating signal D2, neither in the corresponding section D21 nor in the corresponding section D22. Accordingly, the subsequent data processing circuit and the servo tracking operation keeps on processing the sliced digital data. Therefore, the signal drops S21 and S22 of the SBAD signal S2 corresponding to the data interruption E21 and E22 will affect the optical reading system and causes the incorrect data processing of the data stored in the optical disc or a crash of the optical reading system.

SUMMARY OF THE INVENTION

Therefore, the present invention provides a method capable of detecting a data defect that cannot be located with the SBAD signal.

The present invention provides a method for detecting a data defect. The method includes steps of: detecting a data signal including a master signal generated by a master part of an optical pickup head and a side signal generated by a side part of the optical pickup head; subtracting the master signal from the side signal to obtain a discriminating signal; and detecting whether a data defect is existent according to the discriminating signal.

In an embodiment, the master part of the optical pickup head has four light-receiving portions A, B, C and D, the side part has two light-receiving portions E and G at a first side of the master part and two light-receiving portions F and H at a second side of the master part opposite to the first side, the master signal is the summation of the main-beam signals generated by the light-receiving portions A, B, C and D in response to the received light intensities, and the side signal is the summation of the sub-beam signals generated by the light-receiving portions E, F, G and H in response to the received light intensities.

In an embodiment, the data defect is determined existent when a signal drop is down lower than a threshold value in the discriminating signal.

For example, the data defect results from a scratch or data interruption.

In an embodiment, the method further includes a step of switching a level of a defect-indicating signal to locate the data defect when the data defect is determined existent. For example, the defect-indicating signal is switched from a low level to a high level when the data defect is determined existent.

The present invention further provides a method for detecting a data defect in an optical recording medium. The method includes steps of receiving a master signal generated by a master part of an optical pickup head in response to a light beam reflected from the optical recording medium and a side signal generated by a side part of the optical pickup head in response to the light beam reflected from the optical recording medium; subtracting the master signal from the side signal to obtain a discriminating signal; and detecting whether a data defect is existent in a data storage region of the optical recording medium according to the discriminating signal and the side signal.

In an embodiment, the data defect is determined existent when a signal drop of the discriminating signal is down lower than a first threshold value, and simultaneously a signal drop of the side signal is down lower than a second threshold value. In this case, the data defect might result from a serious scratch.

In an embodiment, the data defect is determined existent when a signal drop of the discriminating signal is down lower than a first threshold value, and simultaneously the side signal has a little variation but higher than a second threshold value. In this case, the data defect might result from data interruption.

The present invention further provides a method for discriminating a data defect in an optical recording medium, which includes steps of: receiving a discriminating signal and a side signal; comparing the discriminating signal with a first threshold value to obtain a first comparing result; comparing the side signal with a second threshold value to obtain a second comparing result; and discriminating the data defect by the first and second comparing results; wherein the discriminating signal is obtained by subtracting a master signal generated by a master part of an optical pickup head from the side signal generated by a side part of the optical pickup head.

In an embodiment, the data defect is determined to be a serious scratch when the discriminating signal is down lower than the first threshold value and the side signal is down lower than the second threshold value simultaneously.

In an embodiment, the data defect is determined to be a small scratch when the discriminating signal is down lower than the first threshold value and the side signal is down but higher than the second threshold value simultaneously.

In an embodiment, the data defect is determined to be data interruption when the discriminating signal is down lower than the first threshold value and the side signal has a little variation which is higher than the second threshold value simultaneously.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

In order to detect a data defect that cannot be located with the SBAD signal, the present invention introduces a RFRP1 signal to dominate or facilitate defect detection. The RFRP1 signal is obtained by subtracting a master signal, which is the summation of the main-beam signals generated by the light-receiving portions A, B, C and D in response to the received light intensities (see FIG. 1), from a side signal, which is the SBAD signal, the summation of the sub-beam signals generated by the light-receiving portions E, F, G and H in response to the received light intensities (see FIG. 1). The RFRP1 signal is a discriminating signal used for discriminating the data defect detection.

In a first embodiment, a RFRP1 signal F1 is used to determine whether there is any data defect existent in the data signal. An example that there are serious and small scratches existing in the data storage region of a disc is given with reference to FIG. 3(a) in which the relationships among RFRP1, data and defect-indicating signals are shown. Due to a serious scratch in the data storage region of the disc, a data signal drop E11 of the data signal E1 is rendered, and a signal drop F11 occurs in the RFRP1 signal F1 correspondingly. Since the signal drop F11 has been down lower than a preset threshold level L3, a peak D31 will occur in the defect-indicating signal D3 to suspend the servo tracking operation of the optical reading system, thereby protecting the optical reading system from errors or hanging. After the scratch has been passed and the defect-indicating signal D3 is switched back to a low level, the servo tracking operation of the optical reading system is restored. The preset threshold level L3 can be a voltage value stored in the optical reading system.

Figure 3A:
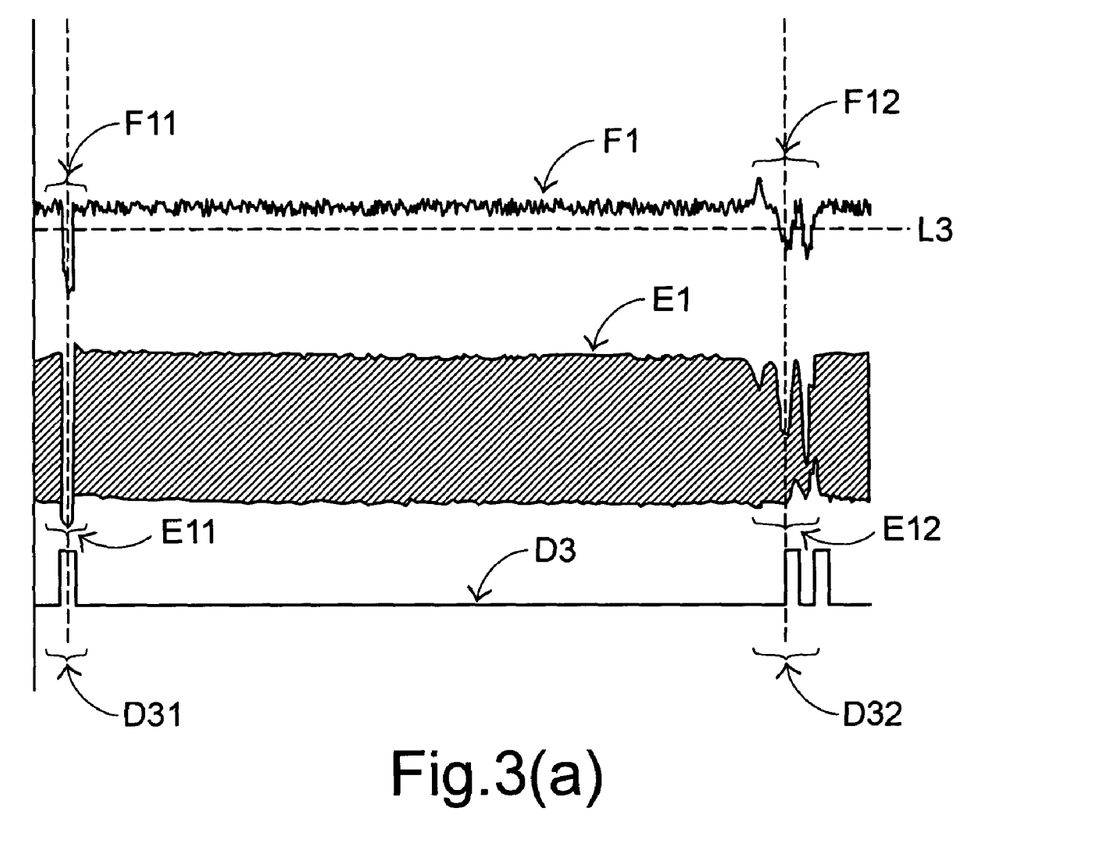
FIG. 3(a) is a schematic diagram showing the relationship among RFRP1, data and defect-indicating signals when there are scratches existing in the read optical disc.

Afterwards, another scratch that is less serious in the data storage region of the disc is encountered, so a less data signal drop E12 of the data signal E1 is rendered. Correspondingly, a less signal drop F12 occurs in the RFRP1 signal F1. Since the signal drops F12 are also down lower than the preset threshold level L3, peaks D32 will occur in the defect-indicating signal D3 to suspend the servo tracking operation of the optical reading system. After the scratch has been passed and the defect-indicating signal D3 is switched back to a low level, the servo tracking operation of the optical reading system is restored.

Figure 3B:
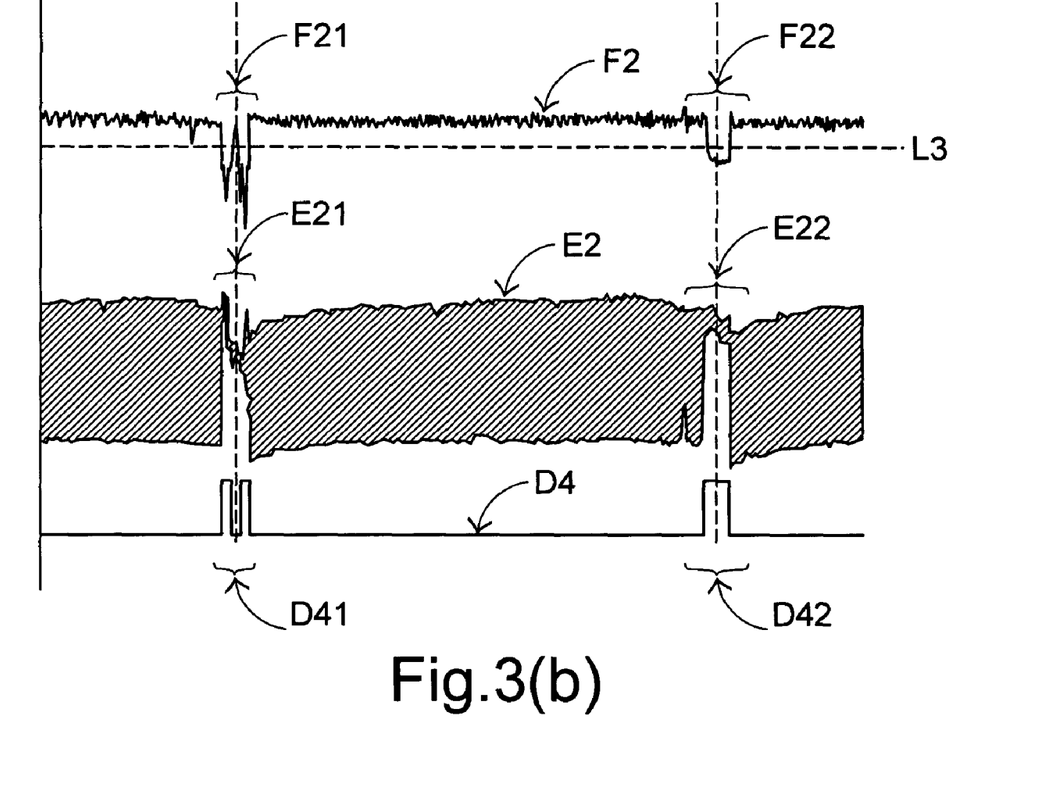
FIG. 3(b) is a schematic diagram showing the relationship among RFRP1, data and defect-indicating signals when there are data interruptions occurring in the read optical disc.

The RFRP1 signal can also be applied to detect data defect resulting from data interruption. For example, data interruptions E21 and E22 occur in the data signal E2 as illustrated in FIG. 3(b). As shown, signal drops F21 and F22 of the RFRP1 signal F2 occur corresponding to the data interruption E21 and E22 and become lower than the preset threshold level L3.

Therefore, peaks D41 and D42 occur in the defect-indicating signal D4 to indicate the data defects E21 and E22. Accordingly, the servo tracking operation of the optical reading system is suspended when encountering with these areas.

The above embodiment of data-defect detection method is sensitive enough to respond to a small scratch. In other words, the servo tracking operation of the optical reading system in the small-scratch area will be suspended. As known to those skilled in the art, however, the data defect resulting from a small scratch is usually recoverable. Thus, it may sometimes be disadvantageous to skip the data within the scratch area instead of recovering it. Therefore, in a second embodiment of the present invention, both of the RFRP1 signal and the SBAD signal are referred to determine whether there is any data defect existent in the data signal.

Figure 4A:
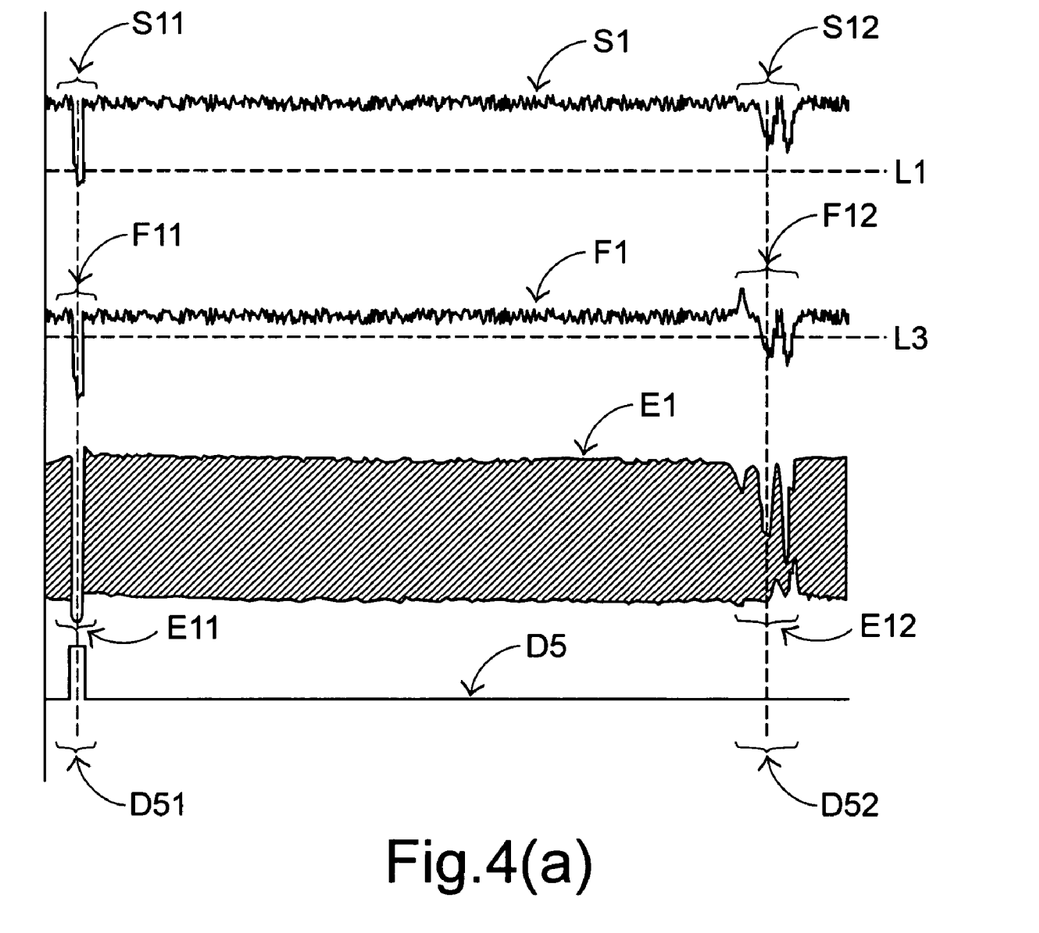
FIG. 4(a) is a schematic diagram showing the relationship among SBAD, RFRP1, data and defect-indicating signals when there are scratches existing in the read optical disc.

In a case that there are serious and small scratches existing in the data storage region of a disc, the relationships among SBAD, RFRP1, data and defect-indicating signals are shown in FIG. 4(a). Due to a serious scratch in the data storage region of the disc, a data signal drop E11 of the data signal E1 is rendered. Thus, a signal drop S11 occurs in the SBAD signal S1 and a signal drop F11 occurs in the RFRP1 signal F1 correspondingly. Afterwards, another scratch that is less serious in the data storage region of the disc is encountered, so a less data signal drop E12 of the data signal E1 is rendered. Correspondingly, a less signal drop S12 occurs in the SBAD signal S1 and a less signal drop F12 occurs in the RFRP1 signal F1.

Figure 4B:
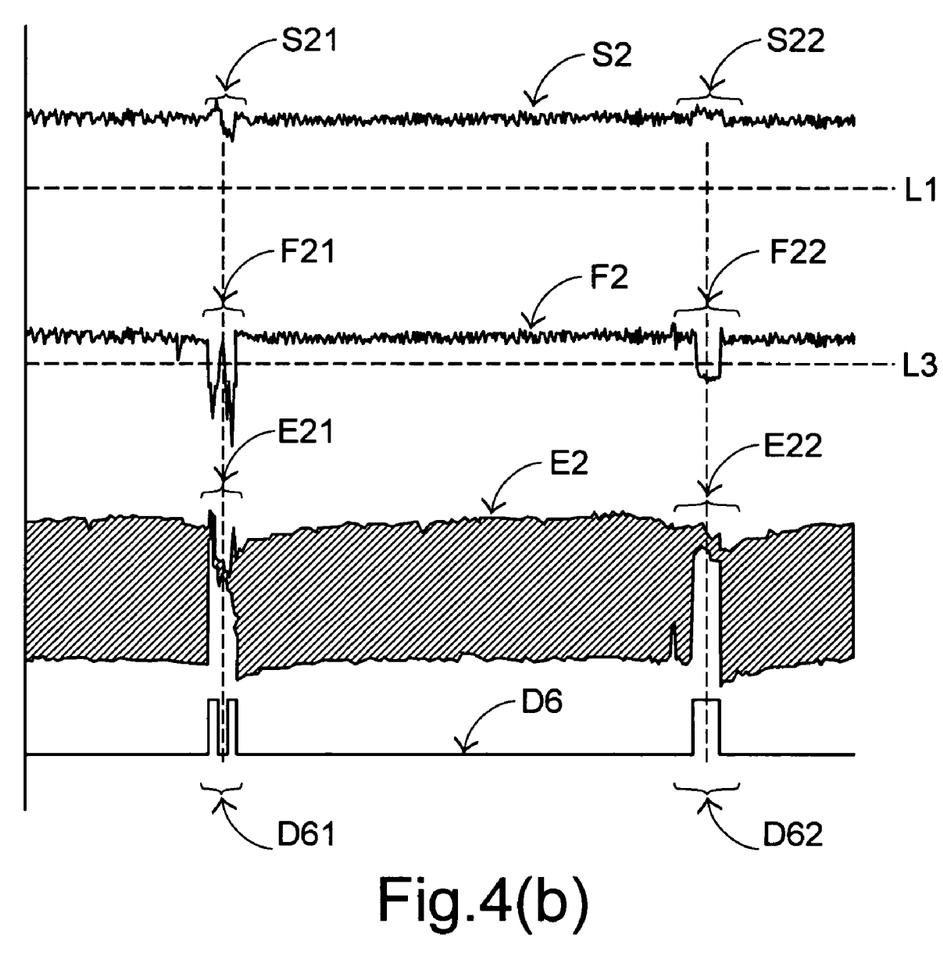
FIG. 4(b) is a schematic diagram showing the relationship among SBAD, RFRP1, data and defect-indicating signals when there are data interruptions occurring in the read optical disc.

In another case that there are data interruptions existing in the data storage region of a disc, the relationships among SBAD, RFRP1, data and defect-indicating signals are shown in FIG. 4(b). As shown, signal drops F21 and F22 of the RFRP1 signal F2 occur corresponding to the data interruption E21 and E22 and become lower than the preset threshold level L3. On the other hand, the SBAD signal S2 has little variation but higher than the preset threshold level L1 at S21 and S22 corresponding to the data interruption E21 and E22.

Therefore, the second embodiment of the data-defect detecting method according to the present invention utilizes the combination states of the SBAD and RFRP1 signals to determine the data-defect type, and then determines whether the servo tracking operation should be suspended or not.

Figure 5:
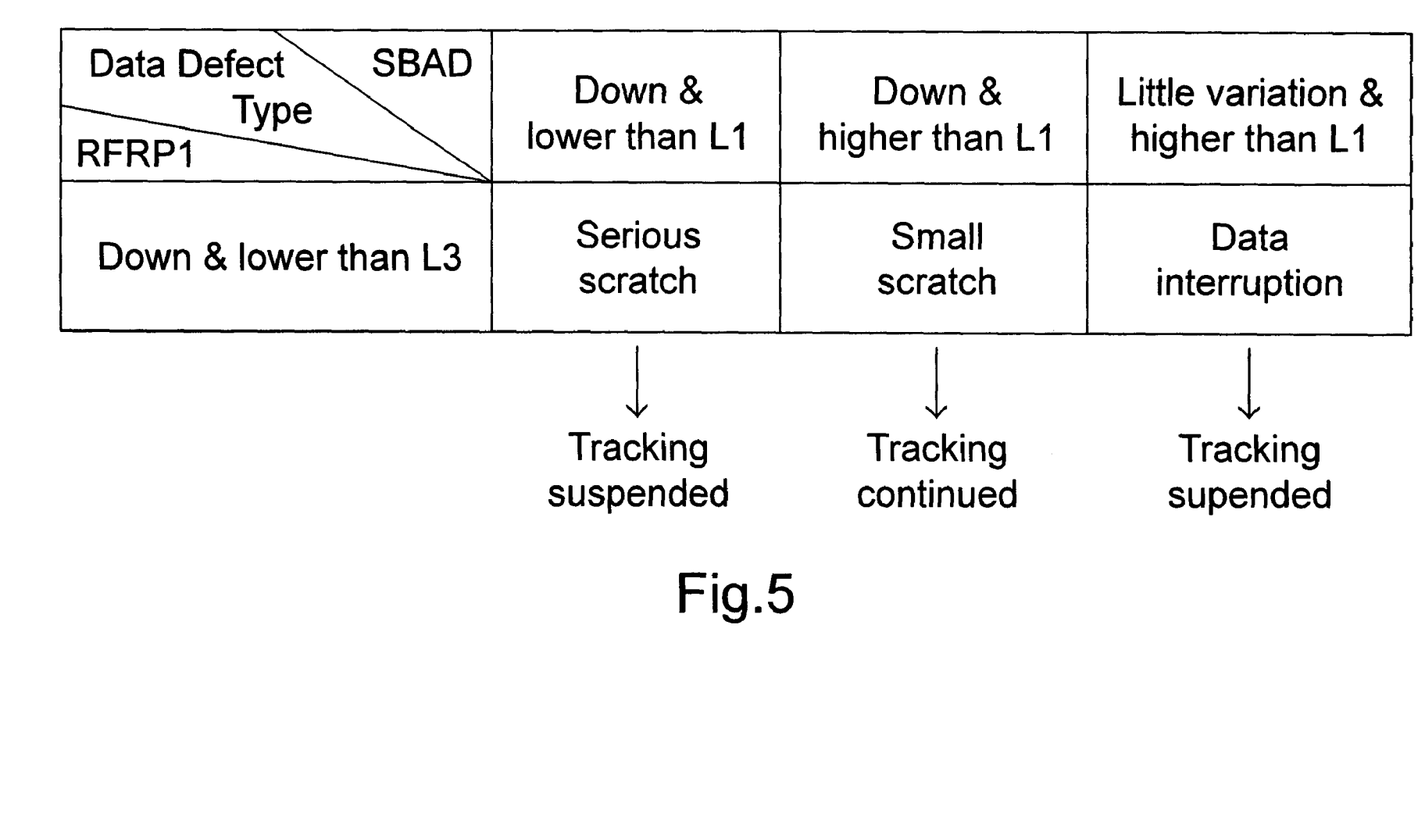
FIG. 5 is a table illustrating a data-defect discriminating algorithm according to an embodiment of the present invention.

Please refer to FIG. 5 which is a table summarizing the discriminating algorithm of the second embodiment of data-defect detecting method according to the present invention. When there are signal drops simultaneously occurring in both the RFRP1 and SBAD signals to levels lower than respective preset threshold levels L3 and L1, it is determined that there is a serious scratch existing in the data storage region of the disc. Therefore, a high level D51 is rendered in the defect-indicating signal D5 as illustrated in FIG. 4(a) and the servo tracking operation is suspended. If there are signal drops simultaneously occurring in both the RFRP1 and SBAD signals but only the signal drop of the RFRP1 signal is down lower than the preset threshold level L3, and the SBAD signal is down but higher than the preset threshold level L1, it will be determined that there is a small scratch existing in the data storage region of the disc. In this case, no peak is rendered in the corresponding portion D52 of the defect-indicating signal D5 as illustrated in FIG. 4(a). It means that the scratch can be omitted and the servo tracking operation will continue to be performed normally. Further, if the RFRP1 signal is down lower than the preset threshold level L3 but there is little variation which is higher than the preset threshold level L3 in the SBAD signal correspondingly, it will be determined that data interruption occurs. Therefore, peaks D61 and D62 are rendered in the defect-indicating signal D6 as illustrated in FIG. 4(b), and the servo tracking operation is preferably suspended to avoid reading errors.

According to the present method, the data defect resulting from data interruption can be located by referring to the RFRP1 signal. Moreover, by referring to both the RFRP1 signal and the SBAD signal, the data defect resulting from data interruption can be located while omitting the small scratch. Accordingly, the servo tracking operation of the optical reading system can be adequately suspended to prevent from reading errors without losing too much data.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for detecting a data defect, comprising:
   detecting a data signal including a master signal generated by a master part of an optical pickup head and a side signal generated by a side part of the optical pickup head, wherein the master part of the optical pickup head has four light-receiving portions A, B, C and D, the side part has two light-receiving portions E and G at a first side of the master part and two light-receiving portions F and H at a second side of the master part opposite to the first side, the master signal is the sum of each main-beam signal generated by the light-receiving portions A, B, C and D in response to the received light intensities, and the side signal is the sum of each sub-beam signal generated by the light-receiving portions E F, G and H in response to the received light intensities;
   subtracting the master signal from the side signal to obtain a discriminating signal; and
   detecting whether a data defect is existent according to the discriminating signal.

2. The method according to claim 1 wherein the data defect is determined existent if a signal drop is lower than a threshold value in the discriminating signal.

3. The method according to claim 1 wherein the data defect results from a scratch or data interruption.

4. The method according to claim 1 further comprising switching a level of a defect-indicating signal to locate the data defect if the data defect is determined existent.

5. The method according to claim 4 wherein the defect-indicating signal is switched from a low level to a high level if the data defect is determined existent.

6. An apparatus, comprising:
   means for detecting a data signal including a master signal generated by a master part of an optical pickup head and a side signal generated by a side part of the optical pickup head, wherein the master signal is a sum of each main-beam signal generated by a plurality of light-receiving portions of the master part, and wherein the side signal is a sum of each sub-beam signal generated by a plurality of light-receiving portions of the side part of the optical pickup head;
   means for subtracting the master signal from the side signal to obtain a discriminating signal; and
   means for detecting whether a data defect is existent according to the discriminating signal.

7. The apparatus of claim 6 wherein the data defect is determined existent when a signal drop is lower than a threshold value in the discriminating signal.

8. The apparatus of claim 6 further comprising means for suspending a servo tracking operation.

9. An apparatus for detecting a defect, comprising:
a component configured to detect a data signal including a master signal generated by a master part of an optical pickup head and a side signal generated by a side part of the optical pickup head, wherein the master signal is a sum of each main-beam signal generated by a plurality of light-receiving portions of the master part, and wherein the side signal is a sum of each sub-beam signal generated by a plurality of light-receiving portions of the side part of the optical pickup head;
a component configured to subtract the master signal from the side signal to obtain a discriminating signal; and
a component configured to detect whether a data defect exists according to the discriminating signal.

10. The apparatus of claim 9 wherein the data defect is determined to exist when a signal drop is lower than a threshold value in the discriminating signal.

11. The apparatus of claim 9 wherein the data defect results from a scratch or data interruption.

12. The apparatus of claim 9 further comprising a component configured to switch a level of a defect-indicating signal to locate the data defect when the data defect is determined to exist.

13. The apparatus of claim 12 wherein the defect-indicating signal is switched from a low level to a high level when the data defect is determined to exist.

14. The apparatus of claim 13 wherein the defect-indicating signal is switched from the high level to the level when the data defect is determined to no longer exist.

15. The apparatus of claim 9 further comprising a component that suspends a servo tracking operation if the data defect exists.

16. The apparatus of claim 9 further comprising a component that suspends a servo tracking operation if an interruption exists in the data signal.

17. The apparatus of claim 9 further comprising a component that continues a previously suspended servo tracking operation when a previously detected data defect or data signal interruption no longer exists.

18. A method for detecting a data defect, comprising:
detecting a data signal including a master signal generated by a master part of an optical pickup head and a side signal generated by a side part of the optical pickup head, wherein the master signal is a sum of each main-beam signal generated by a plurality of light-receiving portions of the master part, and wherein the side signal is a sum of each sub-beam signal generated by a plurality of light-receiving portions of the side part of the optical pickup head;
subtracting the master signal from the side signal to obtain a discriminating signal; and
detecting whether a data defect is existent according to the discriminating signal.

* * * * *